United States Patent
Storm et al.

(10) Patent No.: US 7,915,748 B2
(45) Date of Patent: Mar. 29, 2011

(54) AC ELECTRICAL GENERATION SYSTEM

(75) Inventors: David L. Storm, Danville, IN (US); John M. Storm, Danville, IN (US)

(73) Assignee: Contour Hardening, Inc., Indianapolis, IN (US)

( * ) Notice: Subject to any disclaimer, the term of this patent is extended or adjusted under 35 U.S.C. 154(b) by 0 days.

(21) Appl. No.: 12/684,550

(22) Filed: Jan. 8, 2010

(65) Prior Publication Data

US 2010/0109340 A1 May 6, 2010

Related U.S. Application Data (63) Continuation of application No. PCT/US2008/069669, filed on Jul. 10, 2008.

(60) Provisional application No. 60/948,803, filed on Jul. 10, 2007.

(51) Int. Cl.
F02D 29/06 (2006.01)
H02P 9/04 (2006.01)

(52) U.S. Cl. .................................................. 290/40 C

(58) Field of Classification Search ................ 290/40 C, 290/17; 477/2; 180/69.6, 65.235, 65.6, 364
See application file for complete search history.

(56) References Cited

U.S. PATENT DOCUMENTS

| | | | |
|---|---|---|---|
| 2,612,249 A | 9/1952 | Horn | |
| 3,883,794 A | 5/1975 | Sivley | |
| 4,048,864 A | 9/1977 | Ritter | |
| 4,241,618 A | 12/1980 | Smirl | |
| 4,310,768 A | 1/1982 | Colley | |
| 5,068,591 A | 11/1991 | Hoegberg et al. | |
| 5,755,303 A | 5/1998 | Yamamoto et al. | |
| 6,219,608 B1 * | 4/2001 | Abo et al. ........................ 701/51 |
| 6,394,206 B1 | 5/2002 | Fury | |
| 6,522,024 B1 * | 2/2003 | Takaoka et al. ............. 290/40 C |
| 6,554,088 B2 | 4/2003 | Severinsky et al. | |
| 6,849,026 B2 * | 2/2005 | Sakamoto et al. ................. 477/5 |
| 6,979,913 B2 | 12/2005 | Storm et al. | |
| 7,057,303 B2 | 6/2006 | Storm et al. | |
| 7,576,501 B2 * | 8/2009 | Okubo et al. .................. 318/139 |
| 2002/0094911 A1 * | 7/2002 | Haka ............................. 477/211 |
| 2002/0130519 A1 * | 9/2002 | Nakajima et al. ........... 290/40 C |
| 2004/0174018 A1 | 9/2004 | Itoh | |
| 2005/0077731 A1 * | 4/2005 | Shimizu ...................... 290/40 C |
| 2005/0184528 A1 | 8/2005 | Storm | |
| 2007/0095586 A1 * | 5/2007 | Luedtke ....................... 180/65.3 |

FOREIGN PATENT DOCUMENTS

KR 20-1998-0007346 4/1998
WO WO 2006/034582 A1 * 4/2006

OTHER PUBLICATIONS

RealPower, "Turn Your Truck Into a Mobile Power Station with RealPower" product brochure.
International Search Report, PCT/US2008/069669.

* cited by examiner

*Primary Examiner* — Julio Gonzalez
(74) *Attorney, Agent, or Firm* — Woodard, Emhardt, Moriarty, McNett & Henry LLP (57) ABSTRACT

Disclosed herein is an AC electrical generator system for coupling a variable speed rotating power source to an AC electrical generator through a continuously variable transmission having a finite variable transmission ratio. A controller controls the continuously variable transmission to transform rotational energy from the variable speed power source into substantially constant speed rotation of the AC electrical generator to produce AC electricity with frequency variations within an acceptable range.

20 Claims, 7 Drawing Sheets

AC ELECTRICAL GENERATION SYSTEM

REFERENCE TO RELATED APPLICATIONS

The present application is a continuation of International Patent Application No. PCT/US2008/069669 filed Jul. 10, 2008, which claims the benefit of U.S. Provisional Application No. 60/948,803 filed Jul. 10, 2007, both of which are hereby incorporated by reference in their entirety.

BACKGROUND

The present disclosure relates to electrical generators and more specifically, alternating current (AC) generators for use with variable speed power sources.

There is a need for viable and consistent generation of AC electrical power from energy sources with variable speed. Typically, when dealing with energy sources that have variable output speeds, the traditional solution has been to couple the energy source to a DC generator as DC current is more easily normalized to a constant voltage using techniques known to those skilled in the art.

However, DC power systems have several drawbacks, DC power systems normally run at a relatively lower voltage than comparable AC power systems. As a result, DC systems require larger gauged wiring and components are, on average, larger and more expensive than equivalent AC components. While it is possible to convert a DC electrical current to an AC electrical current by electronically boosting the DC voltage and then artificially chopping the voltage to produce a pseudo AC sine wave, this solution is problematic due to the complex electrical control system necessary to produce the pseudo AC sine wave output and efficiency losses that occur in the required voltage transformation and voltage chopping.

Thus, there is a need to be able to convert a variable speed power source into reliable AC electrical current.

SUMMARY OF THE DISCLOSURE

This disclosure relates to an AC electrical generator system coupled to a variable speed power source which utilizes a variable speed transmission with appropriate control devices to convert the variable speed power source to a substantially constant speed that can be input to a standard AC generator to produce a substantially constant frequency AC electrical current.

In another form, this disclosure relates to a vehicle mounted AC electrical generator system where the vehicle includes a variable speed prime mover power source coupled to a continuously variable transmission which has essentially an infinite number of transmission ratios available within a finite range. The continuously variable transmission is coupled to an AC electrical generator and the continuously variable transmission is controlled to produce a substantially constant output speed.

DETAILED DESCRIPTION

For the purposes of promoting an understanding of the principles of this disclosure, reference will now be made to certain embodiments thereof and specific language will be used to describe the same. It will nevertheless be understood that no limitation of the scope of this disclosure is thereby intended, such alterations, further modifications and further applications of the principles as described herein being contemplated as would normally occur to one skilled in the art to which this disclosure relates.

The present disclosures includes several embodiments that relate to applying a readily available highly commercially developed and relatively inexpensive AC generator to a vehicle instead of the overly complicated DC generators and inverters previously applied to such vehicles. The elements set forth below and depicted in FIGS. 1-8 allow this to be achieved in a way that is consistent with heavy-duty electrical generation that is convenient and safe for use.

In a more general sense, the present disclosure relates to coupling an AC generator to a non-constant speed power source through a continuously variable transmission controlled to transform the non-constant speed from the power source into substantially constant speed to the AC generator.

Figure 1:
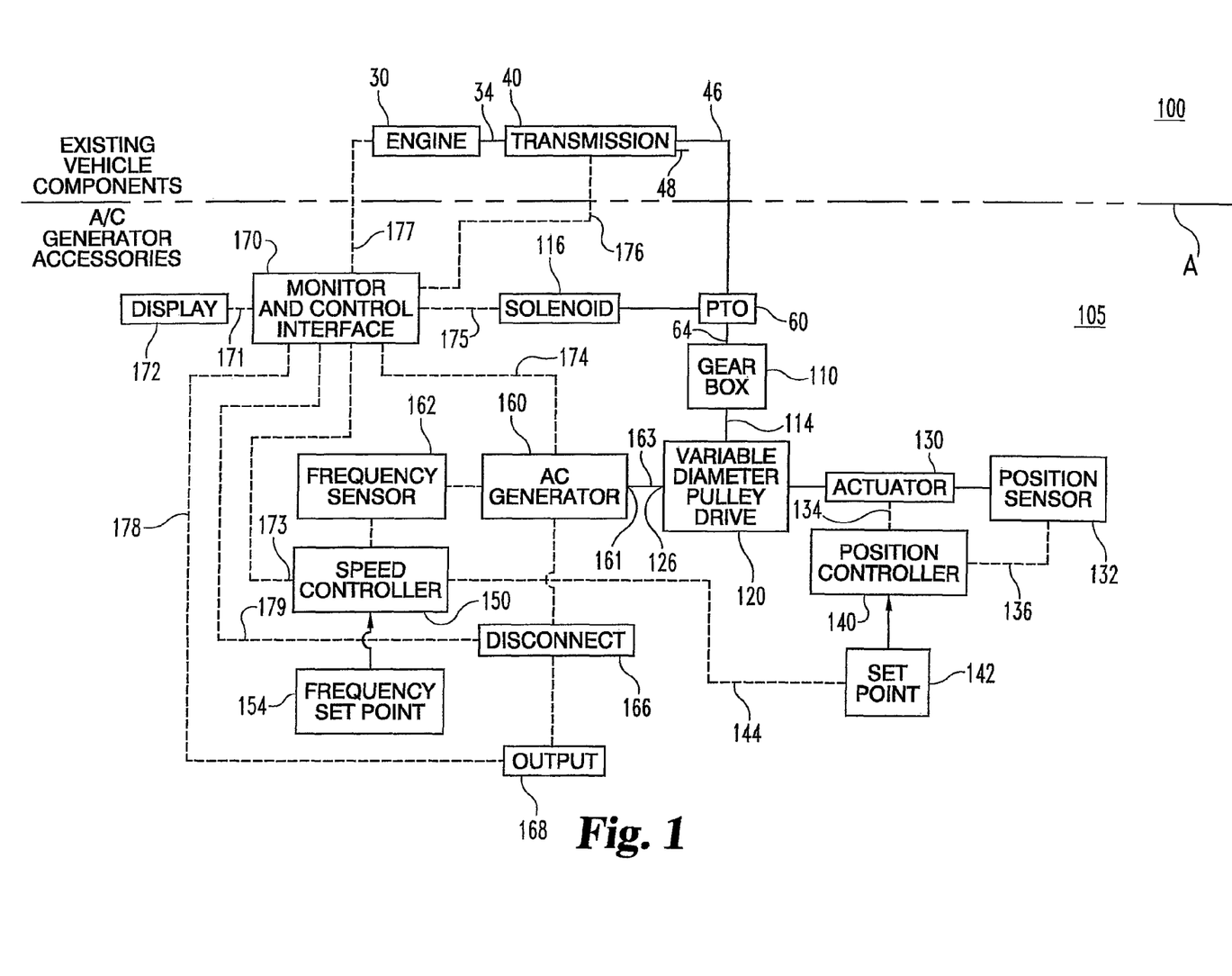
FIG. 1 is a schematic drawing of one embodiment of a system of the present disclosure depicting a prime mover for a vehicle coupled to an AC electrical generator system.
Figure 2:
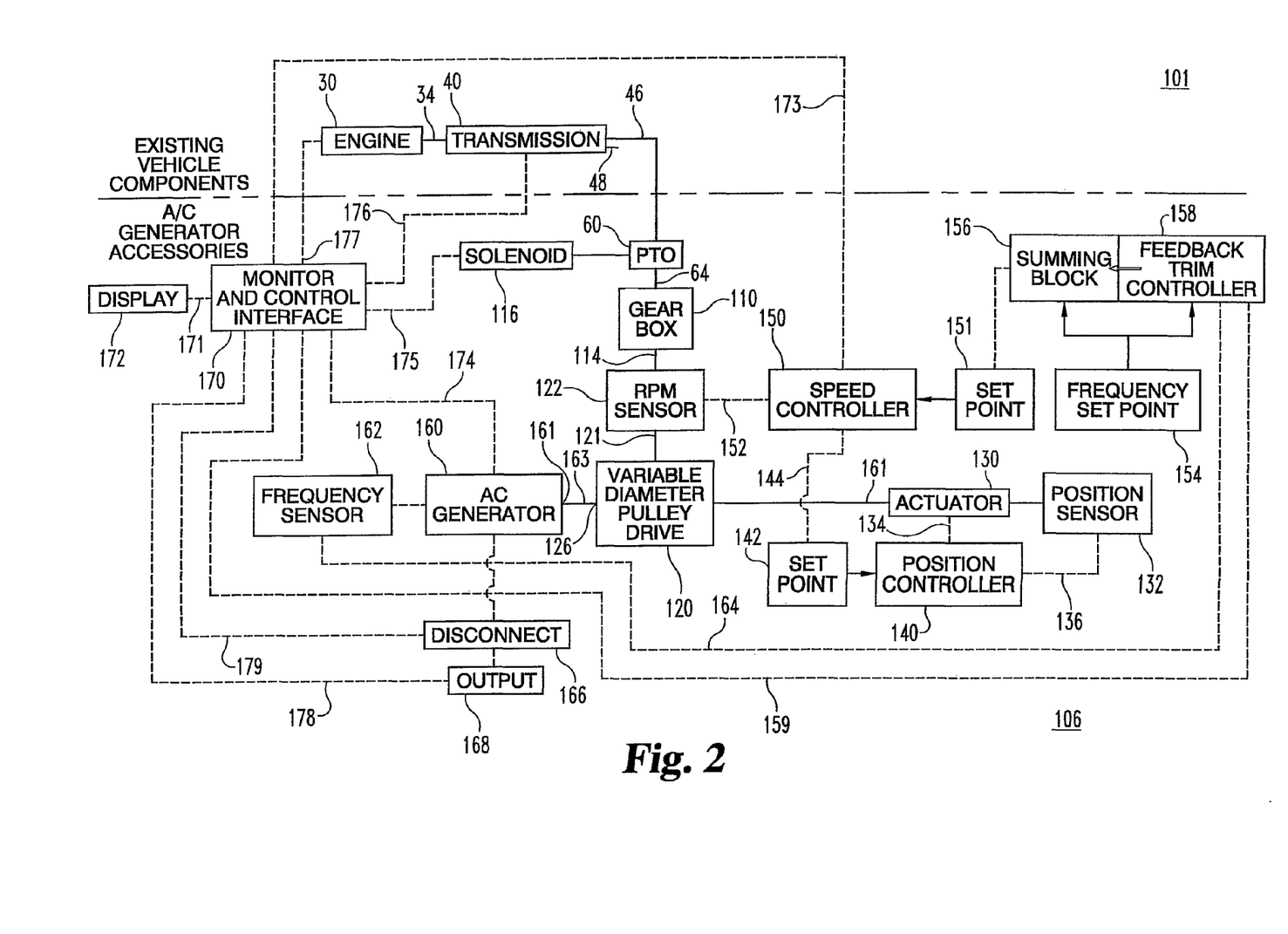
FIG. 2 is a schematic drawing of an alternate embodiment of the system depicted in FIG. 1 including alternative controls.
Figure 3:
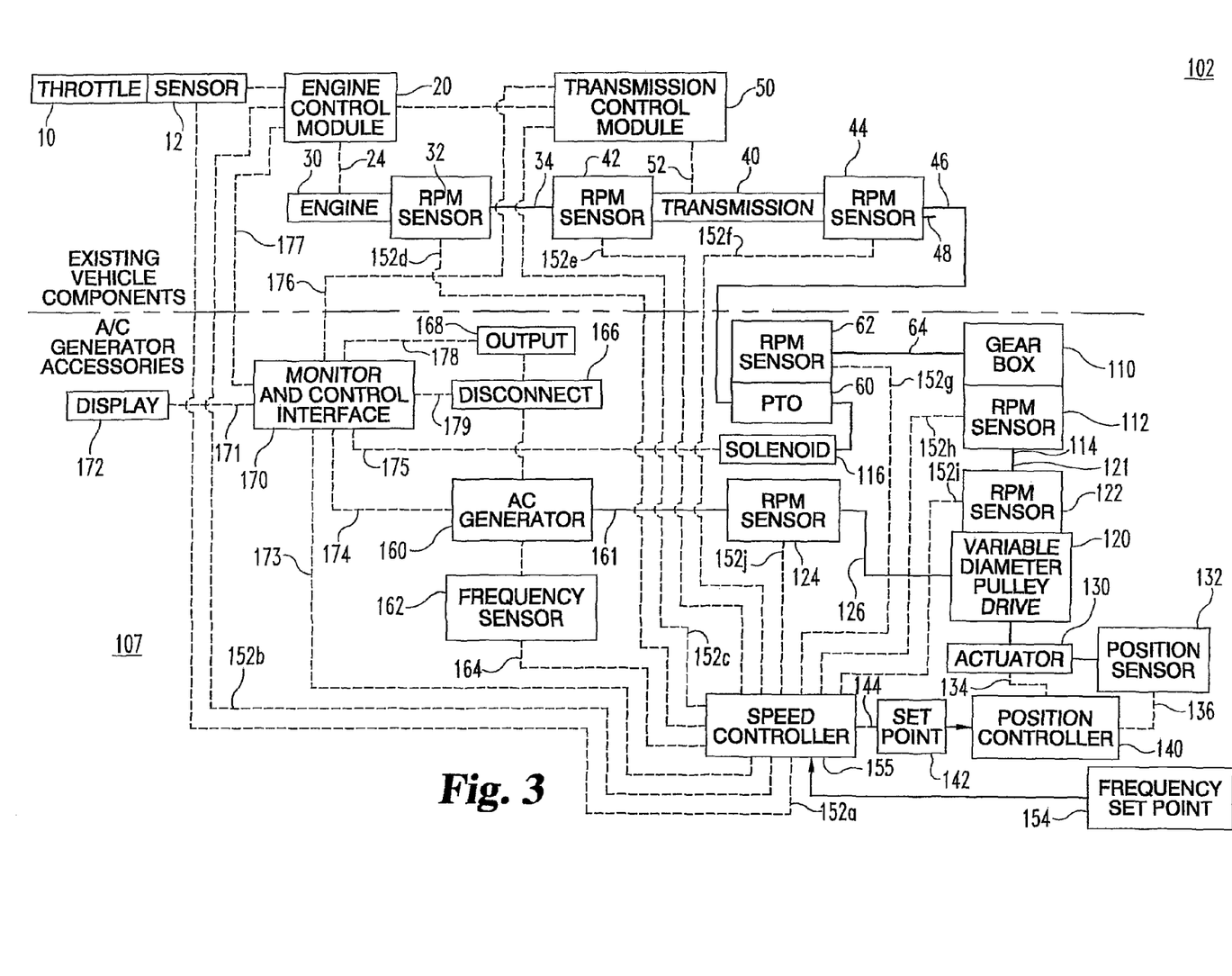
FIG. 3 is a schematic drawing of an alternative embodiment of the systems depicted in FIG. 1 and FIG. 2 depicting alternative control signals.

FIGS. 1-3 illustrate vehicle systems 100, 101 and 102 wherein an AC electrical generating system is incorporated. Existing vehicular components are illustrated demarcated from AC generator accessories by reference line A. Included in the existing vehicle components is vehicle system 100, 101 or 102. Existing vehicle components also include a vehicle frame, which is not illustrated in FIGS. 1-3, but is partially illustrated in FIG. 5. Vehicle systems 100, 101 and 102 (and "vehicle" in general, as referenced herein) may encompass many different types of powered means of transport including land born vehicles such as small or large trucks or buses, water born vehicles such as a boat or ship and even air born vehicles such as an airplane. Vehicle systems 100, 101 and 102 include engine 30 coupled to transmission 40 through primary mechanical output 34, among other components. These components function as the prime mover for vehicle systems 100, 101 and 102. It is noted that, while FIGS. 1-3 describe the incorporation of an AC electrical generating system into a preexisting vehicle which likely includes an independent system for generating electricity, the disclosure herein is not so limited. It is envisioned that the systems disclosed herein could be incorporated into a vehicle as a part of the original vehicle design, with the disclosed AC electrical generating system either providing additional capacity for electrical generation, or replacing all other electrical generating systems.

Engine 30 may be any one of a variety of prime movers including spark-ignited gasoline or natural gas fueled engines or compression ignition diesel engine. It should be apparent to those skilled in the art that other forms of prime movers providing mechanical outputs may be incorporated. Similarly, transmission 40 may be one of a variety of transmissions but shown herein as an automatic transmission providing rotatably output shaft 48, which may be coupled to a differential (not illustrated) as is known in the art. Transmission 40 preferably includes provisions to add power take off unit (PTO) 60, which is a standard feature in class 6 and above truck transmissions. However, use of PTO 60 is not required as described herein.

Still referring in general to FIGS. 1-3, the AC generator systems generally indicated as AC generator systems 105, 106 and 107 include AC generator 160 selected from various sizes and manufacturers for a particular application. Measured in kilowatt output, it has been found that 5 to 15 kilowatts are readily accommodated within vehicles as set out below, although much larger generators can be accommodated with appropriate modifications. It should be apparent to those skilled in the art however that many other AC generators can be employed for this purpose, including a three-phase AC generator. One of the advantages of an AC generator is that it produces a sine wave that replicates the sine wave produced by utility companies as opposed to the modified or mock sine wave produced by standard inverters on the market. It is also a feature of AC generators that they are very robust and easily handle high continuous current loading as may be experienced in many commercial activities.

In the illustrated embodiments, AC generator 160 is positioned in the vehicle outside of the compartment for the prime mover, consisting of engine 30 and transmission 40 as will be described in detail later. However, it should be noted that AC generator 160 could be incorporated almost anywhere, including within the compartments of the prime mover if space allows or if the disclosed system is incorporated in the original vehicle design.

While referring to components in FIGS. 1-3, the same reference numerals are used throughout FIGS. 1-7 to reference components performing similar functions. However, it should be appreciated that appropriate variations may exist between some components labeled with the same reference numeral in various embodiments.

Still referring to FIGS. 1-3, AC generator systems 105, 106 and 107 are coupled to the prime mover (engine 30 and transmission 40) at PTO 60 and gearbox 110. Gearbox 110 is coupled to PTO 60 at output 64 from PTO 60. Gearbox 110 can be a passive gearbox with a 1:1 ratio or can be a multiplying gearbox or a dividing gearbox as will be described later. In some embodiments, PTO 60 can perform the function of gearbox 110, allowing gearbox 110 to be omitted.

PTO 60 is selectively engaged or disengaged from transmission 40 and output 46 with solenoid 116. Solenoid 116 is of a type that is biased to a disengaged position in the absence of an electrical signal then urged to an engaged position when the electrical signal is sent to solenoid 116 via line 175. Powering the coil in solenoid 116 through line 175 results in PTO 60 coupling to output 46. Solenoid 116 in an unpowered state would leave PTO 60 uncoupled. Line 175 connects solenoid 116 to monitor and control interface 170, which enables engagement of solenoid 116, and therefore mechanical operation of PTO 60 and AC generator system 105, 106 or 107, only when certain conditions exist as described herein.

While the mechanical input for AC generator systems 105, 106 and 107, is illustrated as coming from PTO 60, an alternative mechanical input might also be derived from any convenient output of the engine including a primary output of a split transmission, accessory gearboxes, accessory belt drives and the like.

Gearbox 110 is coupled to variable diameter pulley drive (VDPD) 120 through output 114. VDPD 120 is described in further detail in FIG. 5 to FIG. 7, and is also known in the art as a Reeves Drive. In general, it should be noted that variable diameter pulley drives or Reeves Drives, as known in the art, are used to convert a fixed input speed to a variable output speed. For example, Reeves Drives have been used to control the revolution speed of a variable speed wood lathe. However, in the present application, the variable diameter pulley drive or Reeves Drive is used in a reverse orientation, that is, the input speed varies and the output speed is controlled by the drive to be substantially constant as described herein.

VDPD 120, as described in further detail below, comprises two V-belt pulleys split perpendicularly to their axis of rotation with a V-belt running between them. The transmission ratio is changed by moving the two sections of one pulley closer together and the two sections of the other pulley further apart. Due to the V-shaped cross section of the belt this causes the belt to ride higher on one pulley and lower on the other. Doing this changes the effective diameter of the pulleys, which alters the overall transmission ratio. The distance between the pulleys does not change and neither does the length of the belt, so changing the transmission ratio means both pulleys must be adjusted (one bigger, the other smaller) simultaneously to maintain the proper tension on the belt.

VDPD 120, as depicted in FIGS. 1 to 3 and 5 to 7, operates, in general, with one V-belt pulley pair under constant force, for example, by a spring, while the other V-belt pulley is controlled to a set position. The constant force applied to the first V-belt pulley results in the V-belt moving to an appropriate position dictated by the gap in the second V-belt pulley. As described below, the effective transmission ratio of VDPD 120 is controlled by linear actuator 130 by controlling the positioning of one of the two V-belt pulleys described above. The linear position of actuator 130 is controlled by position controller 140 which receives feedback from position sensor 132 via line 136. Position controller 140 controls the positioning of linear actuator 130 based on set point 142 inputted from speed controller 150 via line 144 as described below.

Actuator 130 can be in any form known to those skilled in the art that can adjust VDPD 120, including pneumatic actuators, hydraulic actuators, linear motors and electro-mechanical actuators. As each different type of actuator has different control methods and systems, it should be understood that whichever control method or system is appropriate is intended to be covered herein and any extraneous elements described herein are not required elements.

Figure 5:
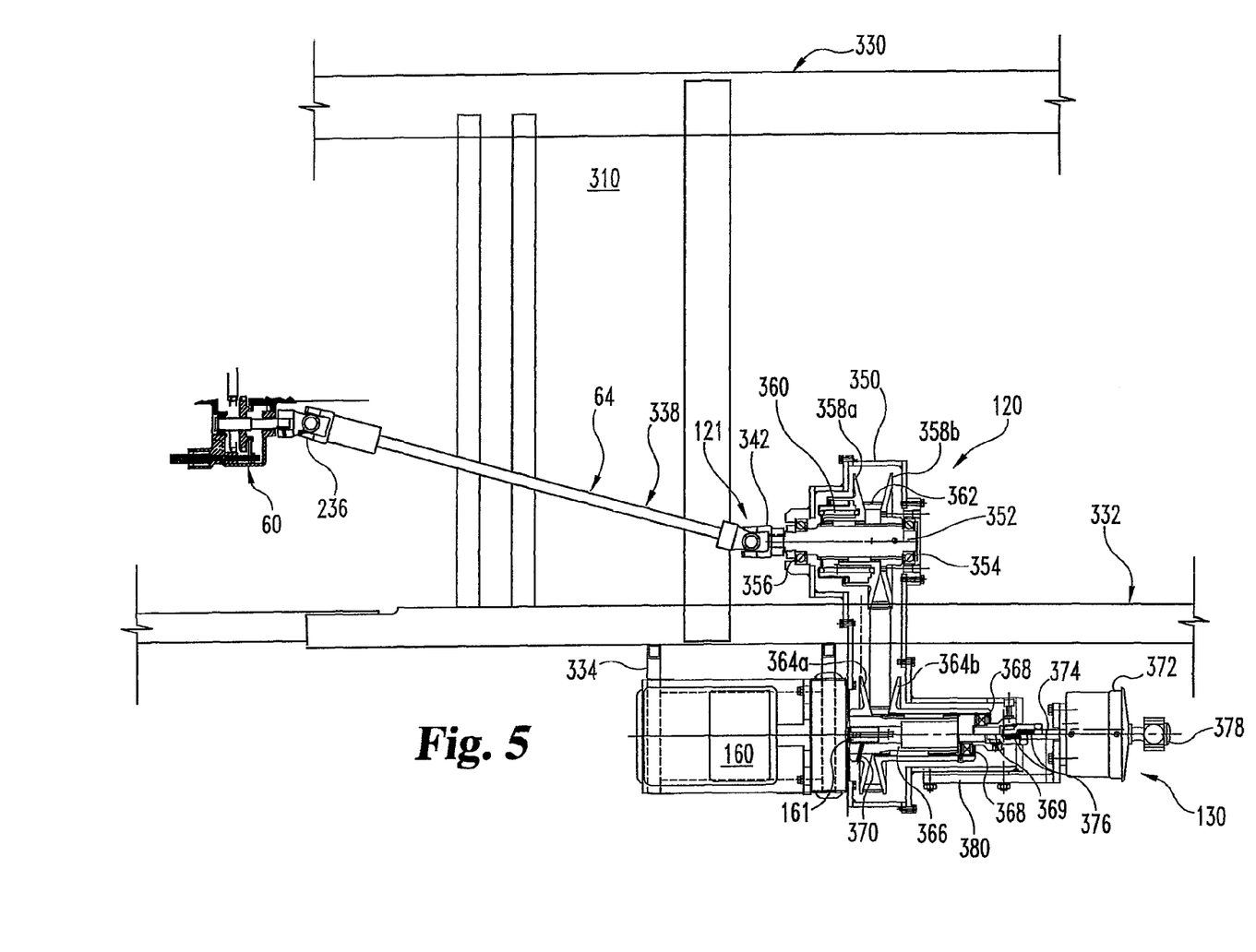
FIG. 5 is a partial, diagrammatic, top plan view of a vehicle in which an AC electrical generating system is installed (according to the present disclosure).

The preferred embodiment at this time is a pneumatic diaphragm linear actuator as described more fully below and as illustrated in FIG. 5. In the case of a pneumatic diaphragm linear actuator, position sensor 132 and/or position controller 140 may be incorporated directly with actuator 130. In particular, in this embodiment, line 136 is a pneumatic control signal varying from 3 to 15 psi acting on one side of a diaphragm. The other side of the diaphragm has a working pressure of approximately 40 to 60 psi applied thereto. The 3 to 15 psi control signal is presented to a positioner, which uses a force balance device to "amplify" the control signal. The "amplified" control signal is balanced against the working pressure on the diaphragm. Movement of the diaphragm results in increasing or decreasing the flow of the working pressure airflow, which moves the position of actuator 130. Accordingly, it should be understood that position sensor 132 and/or position controller 140 as well as lines 134 and 136 are included herein for systems that may require additional components to control actuator 130, but these components are not individually essential. The function of actuator 130 is to respond to set point 142 that controls the actual position of actuator 130, which controls the effective transmission ratio of VDPD 120. As described in more detail below, set point 142 reflects the position required to generate the desired revolution speed at output 126.

AC generator 160 has a mechanical input 161 which is adapted to receive a rotatable input from output 126 of VDPD 120. Input 161 is coupled to VDPD 120 via an appropriate mechanical link such as link 163. In the embodiments illustrated in FIGS. 5 to 7, a direct mechanical coupling is utilized. The actual form of the mechanical link is dependent in part on the space available to install AC generator system 106. Some possible methods of mechanically linking mechanical input 161 is coupled to output 126 include direct drive shaft, offset drive shaft, belt and pulleys or a gear box, as are known in the art.

The frequency of the AC current generated by AC generator 160 is dependent on the speed at which mechanical input 161 is rotated. Variations in the revolution speed at input 161 will correlate to variations in the frequency of the current generated by AC generator 160. In the illustrated embodiment, VDPD 120 converts the variable speed coming from engine 130 and transmission 40 through PTO 60 and gearbox 110 to a substantially fixed speed at output 126. The substantially fixed speed at output 126 is controlled to generate the desired current frequency. The actual ratio of both gearbox 110 and VDPD 120 are selected to match the optimal RPM conditions for AC generator 160 to produce the desired frequency over the operating speed of engine 30 and/or transmission 40. This is done by selecting the diameters of pulleys in VDPD 120 and the transmission ratio in gearbox 110 to achieve the required RPM.

In general, the optimum revolution speed of AC generator 160 to produce a desired frequency is a multiple of the frequency. For example, 60 Hz AC generators are commonly produced with optimal rotation speeds of 1800 RPM or 3600 RPM. Similarly, for 50 Hz AC generators, the optimal input speed is commonly 1500 RPM or 3000 RPM. In any event, regardless of the actual optimal rotation speed for a particular AC generator, the transmission ratios of various components, in particular gear box 110 and VDPD 120, are determined by comparing the optimal rotational speed with the anticipated operating characteristics of vehicle system 100. The optimal rotation speed is compared to the anticipated speed range generated by vehicle system 100 including engine 30 and transmission 40.

In the preferred embodiment, the output of transmission 40 varies between 700 RPM to 2400 RPM, averaging approximately 1550 RPM. The preferred embodiment uses a 3600 RPM generator to produces 60 Hz AC current. Accordingly, in the preferred embodiment, gearbox 110 has a 2:1 transition ratio to effectively double the speed at output 114 as compared to output 64. VDPD 120 has a high-end transmission ratio of 2.6 and a low-end transmission ratio of 0.75. This arrangement allows gearbox 110 and VDPD 120 to convert 700 RPM (1400 RPM after gearbox 110) to 3600 RPM and to also convert 2400 RPM (4800 RPM after gearbox 100) to 3600 RPM. Looking at VDPD 120 over the anticipated full operation range of vehicle system 100, the effective operation range of VDPD 120 is effectively 3.43 over the full range for the preferred embodiment. It has been found that this is an acceptable operating range for good performance from a variable diameter pulley drive. Substantially increasing this range may generate some system instabilities.

Regarding the consistency of the frequency produced by AC generator 160, most electrical equipment permits some fluctuation in frequency. For example, in the United States, UL 2200 permits variations of minus −10 Hz to +8 Hz in a 60 Hz system (or 50 Hz to 68 Hz). As another example, many standards utilizing a 50 Hz standard permit variations of plus or minus 6 Hz (or 44 Hz to 56 Hz). Other countries have similar ranges of allowable frequency, that most electrical equipment is designed to accommodate without damage or failure. Accordingly, the input speed to AC generator 160 can likely experience some fluctuations without adversely affecting the equipment connected thereto. In any event, the amount of allowable fluctuation in the generated frequency ultimately depends upon the range allowed by the equipment connected thereto.

The frequency output of AC generator 160 is monitored by frequency sensor 162. Frequency sensor 162 can be incorporated within the circuitry of AC generator 160 or frequency sensor 162 can be separate. In any event, frequency sensor 162 detects the frequency of the current generated by AC generator 160.

Speed controller 150 includes frequency set point 154. Frequency set point 154 is normally set at either at 50 Hz for European standard electronic equipment or 60 Hz for US standard electronic equipment. However, frequency set point 154 could be any desired frequency for a particular application. It should be noted that frequency set point 154 could be in the form of a registry control with two options. One being 50 Hz and the other being 60 Hz to conform with U.S. and European standards. Or alternatively, frequency set point 154 could be preprogrammed at either 50 or 60 Hz. It is also anticipated that frequency set point 154 could be adjustable over a range, for example through a speed pot or other form of variable input.

The electrical output of AC generator 160 is coupled to output 168 through disconnect 166. In one embodiment, output 168 is in the form of electrical receptacles utilized to power other electrical devices via conventional plugs. For example, 120 VAC or 240 VAC plugs commonly found in the U.S. In other embodiments, output 168 may be directly wired to equipment or components incorporated within the vehicle. For example, a high voltage refrigeration system on a delivery truck or the appliances and outlets in a recreational vehicle. In addition, either output 168 or disconnect 166 may also incorporate an emergency stop switch and/or over-temperature sensors. Both disconnect 166 and output 168 are coupled to monitor and control interface 170.

Monitor and control interface 170 monitors both vehicle systems 100, 101 and 102 and AC generator systems 105, 106 and 107 and includes various interlocks to prevent operation in unsafe conditions. Monitor and control interface 170 is coupled to solenoid 116 through line 175 and only energizes solenoid 116 when all other programmed interlocks are met. Monitor and control interface 170 is coupled to engine 30 by line 177 and transmission 40 by line 176 and monitors the operating conditions of engine 30 and transmission 40. Monitor and control interface 170 is coupled to speed controllers 150 and 155 by line 173, disconnect 166 by line 179 and output 168 by line 178. Monitor and control interface 170 is coupled to AC generator 160 by line 174 If monitor and control interface 170 determines the output from AC generator 160 is unsafe due to either frequency or voltage issues, then monitor and control interface 170 triggers disconnect 166 to decouple output 168 from AC generator 160. Similarly, if monitor and control interface 170 determines that vehicle system 100, 101 or 102 is operating beyond its performance range, for example, engine 30 is exceeding a maximum RPM limit, then monitor and control interface 170 decouples AC generator system 105, 106 or 107 by de-energizing solenoid 116 and concurrently opening disconnect 166.

Also preferably included is display 172 coupled to monitor and control interface 170 by line 171. Display 172 can be advantageously located near an operator, possibly within the control cab of the vehicle, so that the operator receives feedback regarding power generation by AC generator 160. Display 172 could also include an operator interface to permit the operator to control the operation of AC generator system 105, 106 or 107. For example, the operator interface could permit the operator to actuate solenoid 116 to engage or disengage PTO 60 from transmission 40 (assuming all interlocks are permissive.)

Turning now specifically to the embodiment illustrated in FIG. 1, speed controller 150 receives an input of the frequency output of AC generator 160 from frequency sensor 162. Speed controller 150 compares the frequency measured by frequency sensor 162 to frequency set point 154. This comparison is used, in conjunction with standard control logic in speed controller 150, to control the revolution speed of VDPD 120 at output 126 by controlling set point 142 of position controller 140 via line 144. The control logic is preferably tuned for a particular system to minimize any control osculation while adjusting the revolution speed of VDPD 120 at output 126 as rapidly as possible.

Turning now specifically to the embodiment illustrated in FIG. 2, AC generator system 106 and vehicle system 101 is depicted. AC generator system 106 includes several components that either differ from AC generator system 105 or are not included in AC generator system 105. Specifically, the coupling of VPDP 120 and Gearbox 110 also include RPM sensor 122, which detects the revolution speed of output 114 and/or input 121. RPM sensor 122 can be located either at output 114, input 121 or anywhere in-between. RPM sensor 122 is coupled to speed controller 150 by line 152. Furthermore, speed controller 150 includes set point 151. Set point 151 is initially set at the optimum revolution speed for AC generator 160. Also included in AC generator system 106 is summing block 156 and feedback trim controller 158, as discussed below. Feedback trim controller 158 is additionally coupled to monitor and control interface 170 via line 159.

Speed controller 150 compares the speed measured by RPM sensor 122 with set point 151. This comparison is used, in conjunction with standard control logic in speed controller 150, to control the revolution speed of VDPD 120 at output 126 by controlling set point 142 of position controller 140 via line 144. The control logic is preferably tuned for a particular system to minimize any control osculation while adjusting the revolution speed of VDPD 120 at output 126 as rapidly as possible.

Feedback trim controller 158 monitors frequency sensor 162 via line 164. As illustrated in FIG. 2, feedback trim controller 158 works in conjunction with summing block 156 to adjust speed controller 150 via set point 151. Feedback trim controller 158 and summing block 156 both receive frequency set point 154.

Summing block 156 and feedback trim controller 158 periodically monitor the frequency of the electrical current generated by AC generator 160, as detected by frequency sensor 162, and compares the generated frequency with frequency set point 154. The difference between the generated frequency and frequency set point 154 is monitored over time to tune speed controller 150 to better generate the desired frequency.

In one embodiment, feedback trim controller 158 compares the generated frequency with frequency set point 154 every so often, for example, every 100 milliseconds. Variations between the generated frequency and frequency set point 154 are expressed as a positive or negative value scaled to the variation. This positive or negative value is transferred to summing block 156 every so often, in the example, every 100 ms, where a running total is updated with the value. Summing block 156 sums all the transferred values together over a longer period, for example 30 minutes. When the end of the longer period is reached, summing block 156 adjusts set point 151, controlling speed controller 150 as appropriate to tune the speed that VDPD 120 is turning AC generator 160 to better produce the desired frequency expressed in frequency set point 154.

Regarding the differences between the embodiments illustrated in FIG. 1 and FIG. 2, FIG. 1 could be characterized as one embodiment of a closed loop control where adjustments are made based upon the frequency of the generated current to control the speed of AC generator 160. The embodiments illustrated in FIG. 2 could be characterized as a feed forward control system with automatic trim. In this regard speed controller 150 monitors the input RPM to VDPD 120 rather than the frequency generated by AC generator 160 after speed control by VDPD 120.

The control system embodied by FIG. 2 is dependent upon a known relationship between the speed of input 121, the position of actuator 130 and the resulting speed at output 126. (The speed at output 126 is directly related to the generated frequency, which is what is actually being controlled.) This relationship can be established by calibration testing. Experimentation to date indicates that, while a near linear relationship exists, there are some non-linear characteristics in the relationship which appear to be modelable by a second order polynomial relationship. In this regard, speed controller 150, utilizing this known relationship, can be programmed to control the speed at output 126 based on the speed at input 121 as measured by RPM sensor 122. The known relationship between the input speed and the output seed is programmed directly within speed controller 150 as is known in the art.

Turning now to the embodiment illustrated in FIG. 3, AC generator system 107 and vehicle system 102 are depicted. AC generator system 107 includes several additional features that are not illustrated in AC generator systems 105 or 106 as follows.

Specifically, vehicle system 102 includes throttle 10 and sensor 12. Throttle 10 may be any form known to those skilled in the art. In most applications, throttle 10 may take the form of a foot pedal located in the cab of the vehicle. Sensor 12 is associated with throttle 10 and detects the relative position of throttle 10. In some embodiments sensor 12 may be in the form of a position sensor directly coupled to throttle 10 or directly sensing the position of throttle 10. In other embodiments, sensor 12 may be linked to a mechanical linkage attached to throttle 10 and sensor 12 could be located anywhere along the mechanical linkage. In any event, sensor 12 produces a control signal representative of the relative position of throttle 10 as is known in the art.

In vehicle system 102, engine 30 is controlled by engine control module (ECM) 20 which communicates with engine 30 by line 24. The interconnection between engine control module 20 and engine 30 may vary widely according to the type of engine and the desired control parameters. In most cases, the engine fuel supply system (not shown) is controlled by ECM 20 in accordance with an algorithm based on engine operating parameters such as engine RPM, required torque, ambient temperatures, absolute pressure and a host of other variables. The result is that communication between ECM 20 and engine 30 through line 24 may be a two-way connection wherein parameter signals are transmitted to ECM 20 and control signals are transmitted to engine 30 as is known in the art.

Similarly, transmission 40 has a more sophisticated control in the form of transmission control module 50 interconnected with transmission 40 through line 52 and connected to engine control module 20 through line 22. Transmission control module 50, ECM 20, engine 30 and transmission 40 are all coordinated so that appropriate balance of required power, fuel economy and emissions level is maintained as is known in the art.

In order to facilitate this coordination, engine 30 includes RPM sensor 32 which provides a parameter signal correlated to the actual speed engine 30 is turning. Similarly, transmission 40 includes RPM sensor 42 and RPM sensor 44 located at various points through the transmission to provide additional parameter signals. For example, RPM sensor 42 is located at the input to transmission 40 while RPM sensor 44 is located at output shaft 48. Similarly, in the illustrated embodiment, PTO 60 optionally includes RPM sensor 62 on output 64.

Several additional sensors are included in AC generator system 107 that were not included in AC generator systems 105 or 106. Specifically, RPM sensor 62 is optionally included on output 64; RPM sensor 112 is optionally included on output 114; and RPM sensor 122 is optionally included on input 121. Also, RPM sensor 124 is optionally included within the appropriate mechanical linkage between input 161 and output 126.

Frequency sensor 162 signals speed controller 155 via line 164. Speed controller 155 includes frequency set point 154.

Speed controller 155 controls set point 142 which controls the position of actuator 130 which controls the transmission ratio of VDPD 120 to control the input speed seen by AC generator 160 at input 161. And ultimately, controls the frequency of the AC current generated by AC generator 160. In order to accomplish this, speed controller 155 receives one or more of the following control signals: sensor 12 may be coupled to speed controller 155 by line 152*a*; engine control module 20 may be coupled to speed controller 155 by line 152*b*; transmission control module 50 may be coupled to speed controller 155 by line 152*c*; RPM sensor 32 may be coupled to speed controller 155 by line 152*d*; RPM sensor 42 may be coupled to speed controller 155 by line 152*e*; RPM sensor 44 may be coupled to speed controller 155 by line 152*f*; RPM sensor 62 may be coupled to speed controller 155 by line 152*g*; RPM sensor 112 may be coupled to speed controller 155 by line 152*h*; RPM sensor 122 may be coupled to speed controller 155 by line 152*i*; and/or RPM sensor 124 may be coupled to speed controller 155 by line 152*j*.

Utilizing one or more of the control signals described above, including 152*a* through 152*j*, speed controller 155, using an appropriate algorithm, controls the transmission ratio of VDPD 120 by varying set point 142. Each of the described control signals can be correlated to the frequency generated by AC generator 160 with an appropriate algorithm. Speed controller 155 is preferably tuned for a particular system to minimize control oscillation while adjusting the transmission ratio of VDPD 120 as accurately and rapidly as possible.

It is also possible for additional types of information or data to be imported to speed controller 155 from ECM 20 and/or transmission control module 50. In this regard, it is known in the art for engine control module 20 and transmission control module 50 to have control programs to control the operation of engine 30 and transmission 40 such as to determine when gear shifts occur or to control the fuel air ratio or the amount of fuel being used at any given time. Thus, it is possible to import control signals from ECM 20 or transmission control module 50 to speed controller 155 that include some fore knowledge of future speeds coming from vehicle system 102 that might not be predictable based on any other direct measurement without access to the control program(s) utilized by ECM 20 or transmission control module 50.

It is also envisioned that speed controller 155 could be directly incorporated into engine control module 20 and/or transmission control module 50. Discussions with vehicle and transmission manufacturers has indicated that there is sufficient capacity in engine control module 20 and/or transmission control module 50 that are currently in use in vehicles of interest to perform the functions of speed controller 155 without additional hardware. However, vehicle manufacturers have been reluctant to share the proprietary operation of engine control module 20 and/or transmission control module 50 and are also reluctant to make any alterations to engine control module 20 or transmission control module 50. Even though it is unlikely that a vehicle manufacturer would immediately incorporate the functionality of speed controller 155 directly in existing controller components as vehicle system 102, it is nevertheless anticipated that at some point in the future, possibly when the systems disclosed herein are widely adopted, that vehicle manufacturers could incorporate the functions discussed herein into existing components that already exist on vehicles or use a new controller that controls all of the functions. In any event, the functionality of speed controller 155 can be incorporated wherever appropriate.

Specifically regarding the function of speed controller 155. Speed controller 155 performs similar function to speed controller 150 previously disclosed in AC generator systems 105 and 106. In this regard, speed controller 155 could operate as a closed loop control system based on the signal generated by frequency sensor 162. Conversely, speed controller 155 could operate in a feed forward control mode similar to that discussed in regards to AC generator system 106 utilizing a signal from any of the following inputs: sensor 12, ECM 20, RPM sensor 32, transmission control module 50, RPM sensor 42, RPM sensor 44, RPM sensor 62, RPM sensor 112, RPM sensor 122, and/or RPM sensor 124. The actual control input utilized by speed controller 155 will vary dependent upon the operating parameters of VDPD 120, AC generator 160 and the individual sensor(s) available as input(s). Speed controller 155 can also incorporate the trim functionality previously disclosed in AC generator system 106. The actual algorithm utilized in speed controller 155 could be developed using empirical testing of the actual system or could be modeled from known system parameters.

In some embodiments, the control systems illustrated in FIGS. 1-3 and embodied in systems 100, 101 and 102, utilize a standardized computer network protocol and bus standard to control and communicate with the various components. For example, one embodiment uses the CAN-bus standard for communication and control of both existing vehicle components and AC generator accessories.

Figure 4:
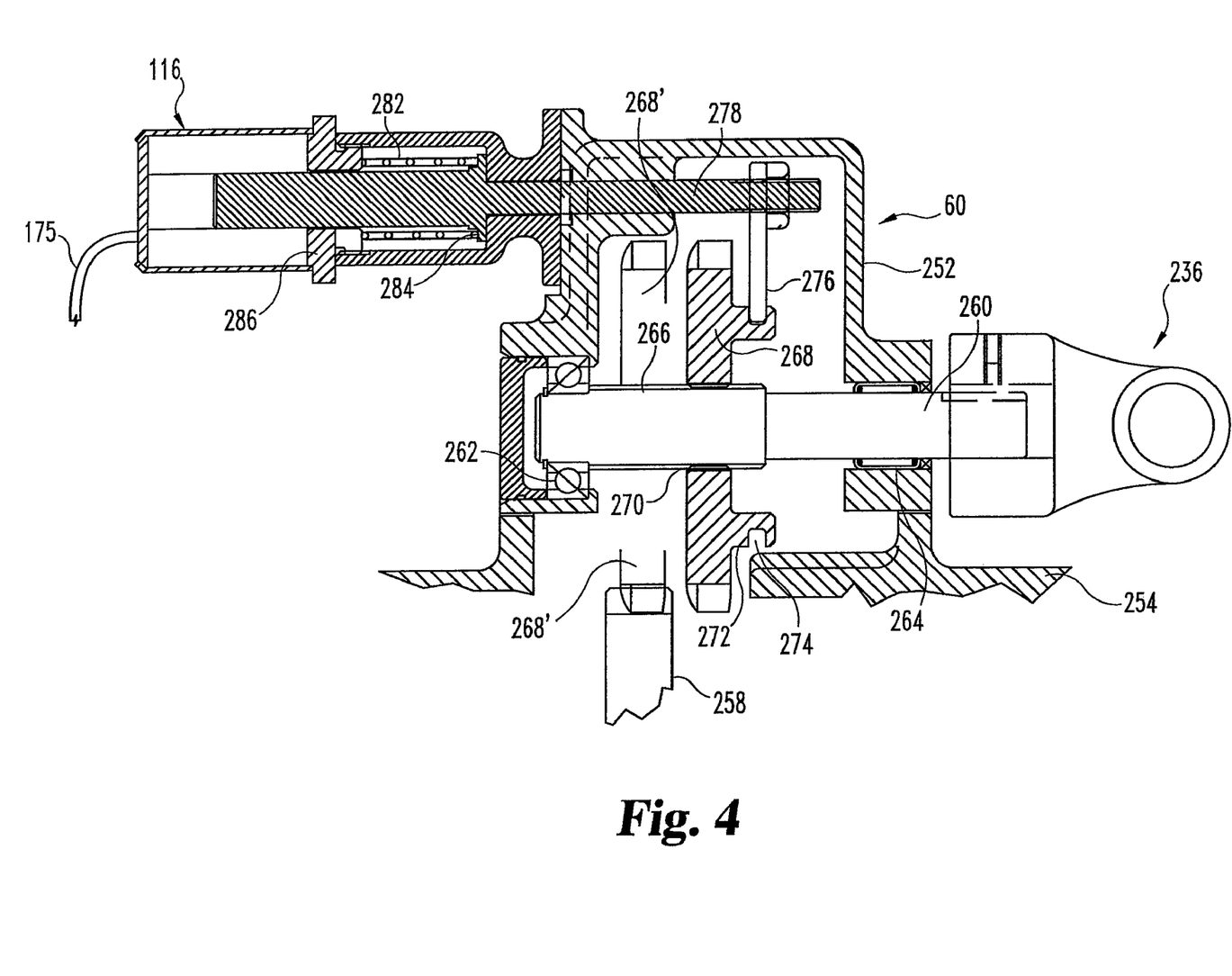
FIG. 4 is an enlarged longitudinal fragmentary sectional view of a power take off (PTO)

PTO 60 is disclosed as being engageable and disengageable with output 46 from transmission 40. FIG. 4 illustrates one implementation of this feature. Housing 252 is secured to transmission housing 254 by appropriate means (not illustrated). Housing 252 is positioned over a transmission PTO drive gear 258. Output shaft 260 is journaled in housing 252 by appropriate bearings 262 and 264 to output shaft 260 on an axis parallel to the axis of transmission 40: The end of output shaft 260 extends from housing 252 and connects with universal joint 236. Output shaft 260 has an elongated splined section 266 on which a spur gear 268 is telescoped. Spur gear 268 has internal splines 270 which cause spur gear 268 to rotate with output shaft 260 but permits it to be axially displaceable from the solid position shown in FIG. 4.

The solid position shown in FIG. 4 illustrates where AC generator system 105, 106 or 107 is disengaged from the prime mover with spur gear 268 located in the far right position spaced apart from PTO drive gear 258. FIG. 4 also illustrates where AC generator system 105, 106 or 107 is engaged with the prime mover when spur gear 268', indicated by partial lines, is located in the far left position engaged with PTO drive gear 258.

Spur gear 268 has an integral extension 272 and groove 274 which receives fork 276. Fork 276 is secured to moveable output shaft 278 of solenoid 116. Output shaft 278 of solenoid 116 is biased to its solid position shown in FIG. 4 by spring 282 acting against a flange 284 on output shaft 278 and end wall 286 in solenoid 116. Solenoid 116 then holds spur gear 268 in its disengaged position by virtue of spring 282 and when electrical power is applied to solenoid 116 by line 175, output shaft 278 is displaced to the left as shown in FIG. 4, thus meshing spur gear 268 with transmission PTO drive gear 258 to cause output shaft 260 and universal joint 236 to rotate. Universal joint 236 is coupled to other components of AC generator system 105, 106 or 107 as described herein.

The size and/or number of teeth of meshing spur gear 268 and transmission PTO drive gear 258 can be varied as necessary to set the transmission ratio of PTO 60. In this regard, a 2:1 transmission ratio could be achieved in this way without the use of gearbox 110.

It should be noted that housing 252 of PTO 60 preferably has an angled outer configuration so as to clear the existing wall of the prime mover compartment. This is particularly advantageous for applications where the PTO is desired to be taken off of a side of the transmission opposite to the provision made by the original equipment manufacturer.

While PTO 60 has been depicted and described herein as utilizing a disengageable meshing spur gear, other means of controlling the engagement of PTO 60 are known in the art. For example, the use of a hydraulically powered clutch plate is a system for engaging a PTO known in the art.

Turning now to FIG. 5, one embodiment of vehicle system 100, 101 or 102 integrated with AC generator system 105, 106 or 107 is depicted on vehicle 310. Vehicle 310 has a pair of frame rails 330 and 332, which are generally parallel to each other and form the structural support for many vehicles. Within frame rails 330 and 332, engine 30 (not shown) is mounted along with transmission 40 (not shown).

Transmission 40 is preferably oriented and mounted in such a way that output shaft 48 is generally parallel to the longitudinal access of frame rails 330 and 332. It should be noted that engine 30 and transmission 40 can be oriented in any way and still achieve benefits of the present disclosure. Output shaft 48 is not shown in FIG. 5 in order to simplify an understanding of the present disclosure. However, it should be apparent to those skilled in the art that output shaft 48 will drive a differential axle at the rear of the vehicle. In other embodiments vehicle 310 may have additional outputs to provide all-wheel-drive by connecting output shaft 48 to a similar differential or drive arrangement at the front of the vehicle. As illustrated in FIG. 5, transmission 40 is an automatic transmission manufactured by Allison Division of General Motors. However it should be apparent that other transmission brands may be used with equivalent advantages. Transmission 40 has a standard mounting plate for mounting a power take off unit that is equivalent for all commercially available transmissions. Transmission 40 also includes power take off drive gear 258 as described above.

As shown, particularly in FIG. 5, PTO 60 has universal joint 236 coupled to output shaft 260 (as specifically illustrated in FIG. 4). Universal joint 236 is connected to torque tube 338 extending aft from the vehicle compartment that substantially houses the prime mover consisting of engine 30 and transmission 40. Torque tube 338 extends to universal joint 342 forming the input to variable diameter pulley drive 120 that connects to AC generator 160.

While torque tube 338 is utilized in the illustrated embodiment to couple PTO 60 to VDPD 120, other linkages would be appropriate in various circumstances. For example, in order to optimally locate required components, PTO 60 could be coupled to VDPD 120 by a belt and pulley drive system, a gearbox, or any other mechanical linkage known in the art.

Variable diameter pulley drive 120 comprises housing 350 having shaft 352 coupled to universal joint 342. Shaft 352 is contained by thrust bearing 354 and bearing 356 and includes V-pulley members 358a and 358b. V-pulley member 358a is movable along shaft 352 while V-pulley member 358b is substantially fixed on shaft 352. Spring 360 provides a lateral force on V-pulley member 358a which compresses V-belt 362 between V-pulley members 358a and 358b. V-belt 362 also passes between V-pulley members 364a and 364b. V-pulley members 364a and 364b are located on shaft 366 with V-pulley member 364a being substantially fixed on shaft 366 and V-pulley member 364b being movable over shaft 366. Shaft 366 is mounted on input 161 to AC generator 160, in part, by set screw 370. Thrust bearing 368 couples V-pulley member 364b to shaft 369, shaft 369 is coupled to linear actuator 130.

Linear actuator 130 comprises pneumatic actuator 372 having movable shaft 374 and air input 378. Linear actuator 130 is coupled to housing 350 by mounting bracket 380 and shaft 374 is coupled to shaft 369 by coupling 376. Coupling 376 is illustrated as a threaded coupling, however, any coupling known in the art could be utilized.

The system illustrated in FIG. 5 operates as follows: pneumatic actuator 372 sets the position of shaft 374, which is linked directly to V-pulley member 364b by thrust bearing 368, shaft 369 and coupling 376. The gap between V-pulley members 364a and 364b dictate the position of V-belt 362. The position of V-belt 362 set by the position of V-pulley member 364a and 364b subsequently dictates the gap between V-pulley members 358a and 358b. The compression force generated by spring 360 maintains the position of V-pulley member 358a in view of the position of V-belt 362.

As illustrated, the position of V-pulley members 358a and 358b and 364a and 364b dictate the transmission ratio through VDPD 120.

Pneumatic actuator 372 is the preferred actuator due to the wide availability of compressed air on many commercial trucks. However, it should be understand that, as previously stated, any actuator capable of producing the required adjustments to VDPD 120 could be used. For example, in commercial vehicles that contain hydraulic systems, for example, a dump truck or a trash truck, a hydraulic actuator may be appropriate. Another potential actuator that could be used is an electro-mechanical actuator comprising a motor and a ball screw. As AC generator systems 105, 106 and 107 described herein generate sufficient electrical current to operate such a motor, this could be a viable alternative. However, one limitation of such a system is having electrical battery capacity sufficient to operate linear actuator 130 when AC generator system 105, 106 or 107 are not generating an appropriate electrical current to operate the motor of the electric-mechanical linear actuator, for example, on start-up. Such battery capacity could be in the form of a high-voltage battery pack as is know in the art.

Specifically regarding pneumatic actuator 372, the preferred embodiment of the pneumatic actuator is optimized to perform in the described system. In particular, commercially available pneumatic actuators typically contain a diaphragm which generates force in one direction. In the illustrated embodiment, the force would be directed towards the left or towards AC generator 160. Movement in the opposite direction requires a spring to provide a return force in the opposite direction. This spring is normally incorporated directly within the pneumatic actuator. Thus, for the pneumatic actuator to operate, sufficient force must be exerted on the diaphragm to overcome the internal spring in order to move the device. However, in the embodiment illustrated in FIG. 5, spring 360 provides an equivalent counter acting return force. In particular, the force generated by spring 360 moves V-pulley member 358*a* as close as possible to V-pulley member 358*b*. This, in turn, exerts an equivalent force on V-pulley members 364*a* and 364*b* by forcing V-pulley member 364*b* to the right. Thus, spring 360 provides a force that can move pneumatic actuator 372 to the right, in the opposite direction of the pneumatic force generated by pneumatic actuator 372. Thus, pneumatic actuator 372 is preferably optimized by removing the internal spring actuation. This, in turn, reduces the amount of pneumatic force required to move and adjust VDPD 120 because the internal spring does not have to be overcome. It is believed this optimization will also increase the responsiveness of VDPD 120.

Figure 6:
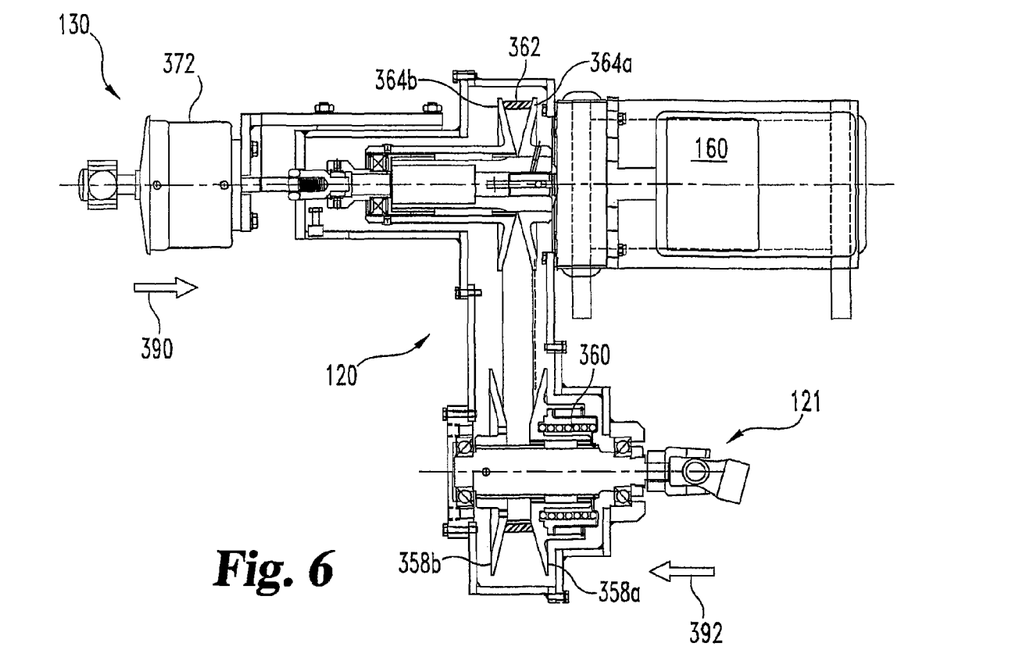
FIG. 6 is a top plan view of the variable diameter pulley drive (VDPD) illustrated in FIG. 5, with the VDPD is depicted in the lowest gear.
Figure 7:
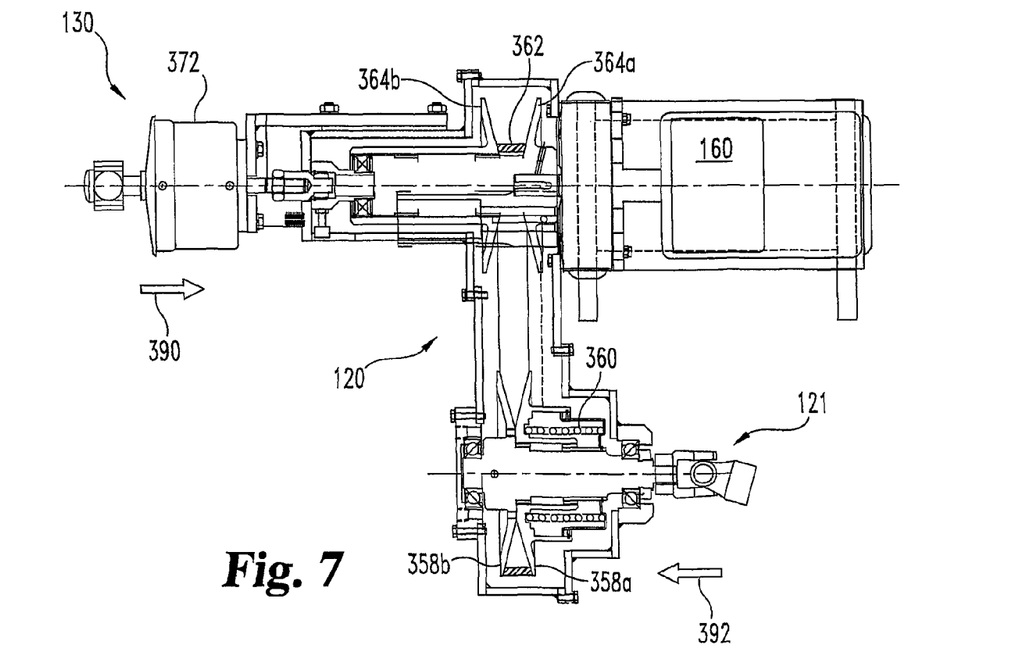
FIG. 7 is a top plan view of the variable diameter pulley drive (VDPD) illustrated in FIG. 5 with the VDPD is depicted in the highest gear.

Turning now to FIGS. 6 and 7, FIGS. 6 and 7 illustrate the apparatus depicted in FIG. 5 in two extreme positions. FIG. 6 illustrates V-pulley members 364*a* and 364*b* located as close together as possible resulting in VDPD 120 reducing the speed at input 121 to the greatest extent possible to AC generator 160. Conversely, FIG. 7 illustrates the opposite extreme where V-pulley members 364*b* and 364*a* are as far apart as possible while still retaining V-belt 362 resulting in VDPD 120 increasing the speed at input 121 to the greatest extent possible to AC generator 160. FIGS. 6 and 7 include arrows 390 and 392. Arrow 390 indicates the direction of force generated by the diaphragm within pneumatic actuator 372 and arrow 392 represents the direction of force generated by spring 360.

Regarding variable diameter pulley drive 120, it should be understood that while it is believed that VDPD 120 is well suited to the disclosed application, any variable or continuously variable transmission in which the ratio of the rotation speeds of the input shaft and the output shaft can be varied continuously within a given range providing substantially infinite number of possible transmission ratios could be used. For example, the following different types of continuously variable transmissions could be utilized: infinitely variable transmission; ratcheting continuously variable transmission; roller-based continuously variable transmission; hydrostatic continuously variable transmission; hydristor infinitely variable transmission or a Simkins' ratcheting CVT.

It is noted that AC electrical generation systems 105, 106, and 107 disclosed herein have been primarily directed towards auxiliary power generation while vehicle systems 101, 102 or 103 typically have separate and self contained, likely DC, electrical generation system. However, it is also envisioned that the disclosed AC electrical generation systems could be utilized as the primary electrical generation system for a vehicle. In this regard, the high voltage AC electric current generated by the disclosed system has many advantages over the traditional low voltage DC systems utilized in vehicles. In particular, components are normally smaller and likely less expensive when using high voltage AC as opposed to low voltage DC. In addition, wiring can be a smaller gauge when using high voltage AC current as opposed to low voltage DC current. Additional savings could also be realized by eliminating duplicative electrical generation systems and having only a single electrical generation system.

It should also be noted that while many of the uses discussed herein for the AC electrical power generated by systems 105, 106 or 107 have been for auxiliary components to the vehicle. It is also envisioned that high power AC electrical current generated by the disclosed system could be utilized as a supplemental power source to the prime mover such as in a hybrid vehicle. The above-discussed advantages of high-powered AC electrical current as opposed to lower power DC electrical current would also apply to a hybrid electrical vehicle. The disclosed systems 105, 106 and 107 could be utilized to power an AC electrical motor operating as an alternative or supplemental prime mover power source.

Figure 8:
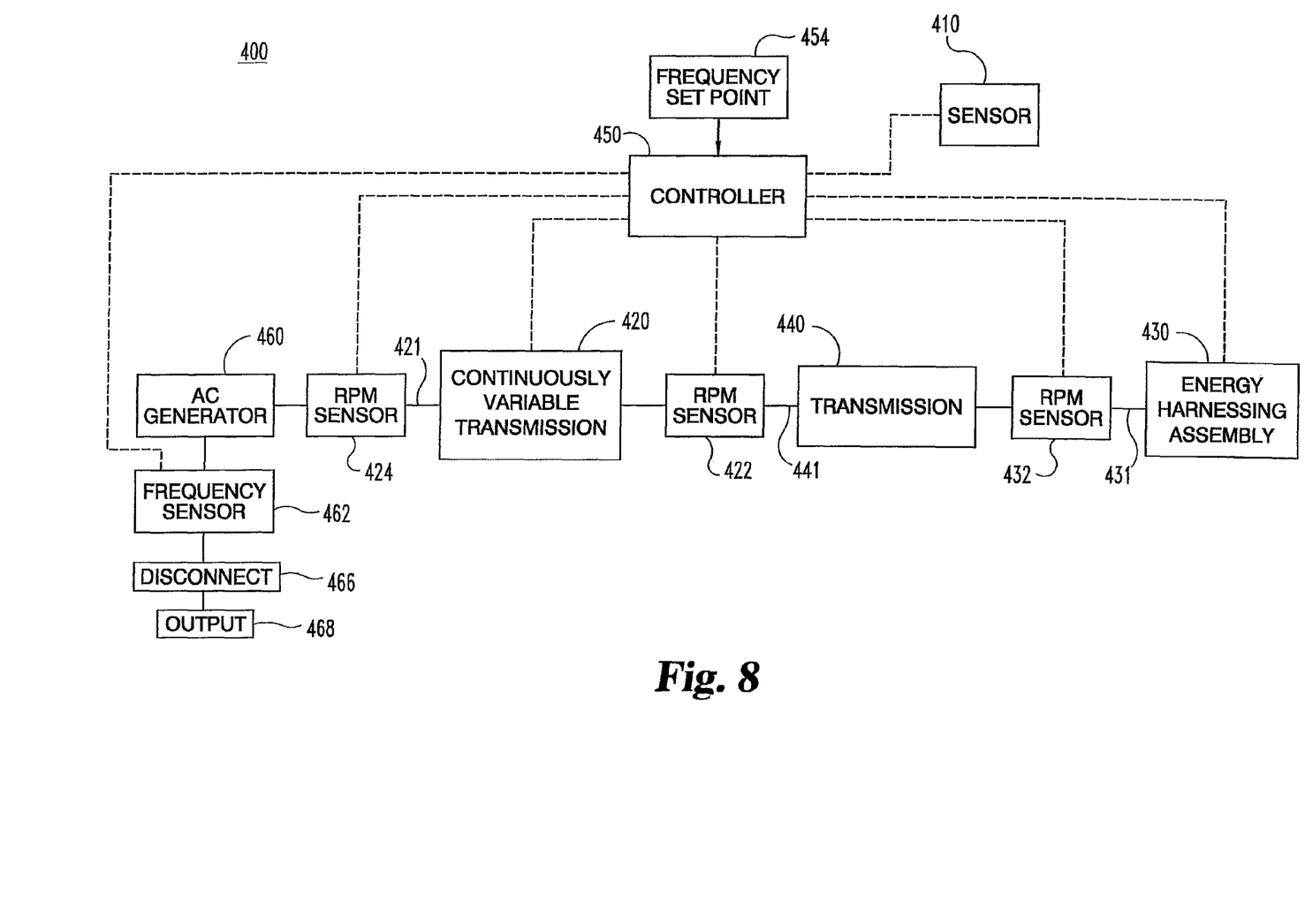
FIG. 8 is a schematic drawing of one embodiment of the present disclosure depicting a system for generating constant AC power from a variable speed power source.

Turning now to FIG. 8, system 400 is depicted wherein an AC electrical generating system coupled to a variable speed energy source, such as a windmill or water wheel. System 400 includes energy-harnessing assembly 430, transmission 440, continuously variable transmission (CVT) 420, AC generator 460, controller 450, disconnect 466 and output 468.

Energy-harnessing assembly 430 may be any apparatus adapted to harness an energy source and covert the energy into mechanical energy in the form of a spinning shaft. Specific non-limiting examples of energy-harnessing assembly 430 include a windmill assembly or a water wheel assembly. A windmill assembly could include a revolving shaft coupled to one or more blades adapted to convert wind energy into mechanical energy in the form of a spinning shaft, as is known in the art. A water wheel assembly could include a shaft-mounted water wheel where the water wheel passes through running water, the water wheel assembly adapted to convert the energy in the moving water into mechanical energy in the form of a spinning shaft, or as presently illustrated, output 431. In any event, the specific details of energy-harnessing assembly 430 are omitted for clarity, as these assemblies are well known in the art.

Transmission 440 may perform several functions. Often, output 431 revolves at a relatively low speed, while AC generator 460 generally requires a relatively high revolution speed for proper operation. Thus, transmission 440 may require a relatively high gear ratio to substantially accelerate the revolution speed coming from energy-harnessing assembly 430 to meet the requirements of AC generator 460.

Transmission 440 may include multiple incremental gear ratios. For example, in the case of a windmill, the output speed could potentially vary between a few revolutions per minute to hundreds (or more) revolutions per minute, depending on the configuration of the windmill and the prevalent wind speeds. Conversely, continuously variable transmission typically operates over a finite range of input speeds. Thus, it may be necessary for transmission 440 to have multiple gear ratios included to maintain output 441 in a range acceptable for CVT 420.

Continuously variable transmission 420 may be any CVT discussed above, including a variable diameter pulley drive (Reeve's drive); a ratcheting continuously variable transmission; a roller-based continuously variable transmission; a hydrostatic continuously variable transmission; a hydristor infinitely variable transmission or a Simkins' ratcheting continuously variable transmission. CVT 420 preferably permits the ratio of the rotation speeds of the input shaft and the output shaft to be varied continuously within a given range while providing a substantially infinite number of possible transmission ratios.

AC generator 460 is preferably a readily available highly commercially developed and relatively inexpensive AC generator, although a custom build AC generator could certainly be utilized as disclosed herein. The particular size, in kW, of AC generator 460 will be dictated by the demand load at output 468 and the available power from energy harnessing assembly 430.

Controller 450 is operable to control the transmission ratio of CVT 420 using whatever control means are appropriate. For example, if CVT 420 is a variable diameter pulley drive, then a linear actuator could controlled by controller 450 to adjust the transmission ratio of CVT 420 as necessary. Controller 450 monitors the operation of various components of system 400 including one or more of the following: sensor 410 which is operable to detect the energy source harnessed by energy harnessing assembly 430; sensor 432 that detects the RPM between energy-harnessing assembly 430 and transmission 440; RPM sensor 422 that detects the RPM between transmission 440 and CVT 420; RPM sensor 424 operable to detect the RPM between CVT 420 and AC generator 460; and frequency sensor 462 operable to detect the frequency of the AC electrical current generated by AC generator 460.

Controller 450 also receives frequency set point 454. Frequency set point 454 is normally set at either at 50 Hz for European standard electronic equipment or 60 Hz for US standard electronic equipment. However, frequency set point 454 could be any desired frequency for a particular application. It should be noted that frequency set point 454 could be in the form of a registry control with two options. One being 50 Hz and the other being 60 Hz to conform with U.S. and European standards. Alternatively, frequency set point 454 could be preprogrammed at either 50 or 60 Hz. Finally, frequency set point 454 could be adjustable over a range, for example through a speed pot or other form of variable input.

Controller 450 controls the operation of CVT 420 and possibly transmission 440, if required, to maintain output 421 at a constant speed such that AC generator 460 produces AC current at a frequency substantially equal to frequency set point 454. Controller 450 could utilize a closed loop control scheme similar to that discussed in regard to AC generator system 105, or controller 450 could utilize a feed-forward control scheme similar to that discussed in regard to AC generator system 106 or 107. Each of the various inputs potentially available to controller 450 could be modeled with an appropriate algorithm developed through modeling or empirical testing.

The electrical current generated by AC generator 460 is coupled to output 468 through disconnect 466. Output 468 can take any form known in the art including electrical outlets, direct connection with other equipment or even a connection to a electrical power grid. (Additional equipment, as known in the art, is required to connect to an electrical power grid.) Disconnect 466 is provided as a safety feature, but is not required.

While the disclosure has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. An AC electrical generator system mounted on a vehicle, the vehicle having a prime mover controlled by a control system and a mechanical output operable to transfer rotational energy from the prime mover, wherein the rotational energy is transferred with a rotational speed in a finite range, the AC electrical generator system comprising:
   an AC electrical generator operable to produce AC electrical energy at a target frequency when rotated a target speed;
   a frequency sensor operable to determine the frequency of the AC electricity generated by said AC electrical generator
   a continuously variable transmission, coupling the mechanical output to said AC electrical generator; said continuously variable transmission having a finite variable transmission ratio; and
   a controller coupled to said continuously variable transmission operable to control said finite variable transmission ratio based at least in part on the determined frequency of the AC electricity generated by said AC electrical generator such that the rotational energy from the mechanical output rotates said AC electrical generator substantially at the target speed to generate AC electricity at the target frequency.

2. The AC electrical generator system of claim 1, wherein said continuously variable transmission is selected from the group consisting of: a variable diameter pulley drive, an infinitely variable transmission, a ratcheting continuously variable transmission, a roller-based continuously variable transmission, a hydrostatic continuously variable transmission, a hydristor infinitely variable transmission and a ratcheting CVT.

3. The AC electrical generator system of claim 1, wherein said continuously variable transmission is a variable diameter pulley drive.

4. The AC electrical generator system of claim 1, wherein the target frequency is 50 Hz to 68 Hz.

5. The AC electrical generator system of claim 1, wherein the target frequency is 44 Hz to 56 Hz.

6. The AC electrical generator system of claim 1, further comprising a gearbox with a fixed transmission ratio located between the mechanical output and said AC electrical generator and in series with said continuously variable transmission.

7. An AC electrical generator system mounted on a vehicle, the vehicle having a prime mover controlled by a control system and a mechanical output operable to transfer rotational energy from the prime mover, wherein the rotational energy is transferred with a rotational speed in a finite range, the AC electrical generator system comprising:
   an AC electrical generator operable to produce AC electrical energy at a target frequency when rotated a target speed;
   a continuously variable transmission, coupling the mechanical output to said AC electrical generator; said continuously variable transmission having a finite variable transmission ratio;
   a controller coupled to said continuously variable transmission operable to control said finite variable transmission ratio such that the rotational energy from the mechanical output rotates said AC electrical generator substantially at the target speed; and
   an RPM sensor operable to determine a rotational speed before said continuously variable transmission, wherein said controller is operable to control said finite variable transmission ratio based at least in part on the determined rotational speed before said continuously variable transmission.

8. The AC electrical generator system of claim 7, wherein said continuously variable transmission is a variable diameter pulley drive and wherein the AC electrical generator system further comprises a pneumatic actuator that adjusts the position of a V-pulley member of said variable diameter pulley drive, wherein said pneumatic actuator does not include internal spring actuation.

9. An AC electrical generator system mounted on a vehicle, the vehicle having a prime mover controlled by a control system and a mechanical output operable to transfer rotational energy from the prime mover, wherein the rotational energy is transferred with a rotational speed in a finite range, the AC electrical generator system comprising:
- an AC electrical generator operable to produce AC electrical energy at a target frequency when rotated a target speed;
- a variable diameter pulley drive, coupling the mechanical output to said AC electrical generator; said variable diameter pulley drive having a finite variable transmission ratio; and
- a controller coupled to said continuously variable transmission operable to control said finite variable transmission ratio such that the rotational energy from the mechanical output rotates said AC electrical generator substantially at the target speed
- a pneumatic actuator that adjusts the position of a V-pulley member of said variable diameter pulley drive, wherein said pneumatic actuator does not include internal spring actuation.

10. A method of generating AC electricity on a moving vehicle, the vehicle having a prime mover controlled by a control system and a mechanical output operable to transfer rotational energy from the prime mover, the method comprising the steps of:
a) providing an AC electrical generator operable to produce AC electrical energy at a target frequency when rotated a target speed, wherein the AC electrical generator is mounted on the vehicle and coupled to the mechanical output to the AC electrical generator through a continuously variable transmission having a finite variable transmission ratio;
b) providing a controller operable control the finite variable transmission ratio;
c) determining the frequency of the electricity generated by the AC electrical generator;
d) providing control logic that correlates the finite variable transmission ratio to the determined frequency and the target frequency;
e) in the controller, determining the finite variable transmission ratio so that the AC electrical generator produces AC electricity at the target frequency;
f) adjusting the transmission ratio of the continuously variable transmission so the AC electrical generator produces AC electricity at the target frequency.

11. The method of claim 10, further comprising the step of:
g) selecting the continuously variable transmission from the group consisting of: a variable diameter pulley drive, an infinitely variable transmission, a ratcheting continuously variable transmission, a roller-based continuously variable transmission, a hydrostatic continuously variable transmission, a hydristor infinitely variable transmission and a ratcheting CVT.

12. The method of claim 10, further comprising the step of:
h) providing a variable diameter pulley drive as the continuously variable transmission.

13. The method of claim 12, further comprising the step of:
k) providing a gearbox with a fixed transmission ratio located between the mechanical output and the AC electrical generator and in series with the continuously variable transmission.

14. A method of generating AC electricity on a moving vehicle, the vehicle having a prime mover controlled by a control system and a mechanical output operable to transfer rotational energy from the prime mover, the method comprising:
a) providing an AC electrical generator operable to produce AC electrical energy at a target frequency when rotated a target speed, wherein the AC electrical generator is mounted on the vehicle and coupled to the mechanical output to the AC electrical generator through a variable diameter pulley drive having a finite variable transmission ratio;
b) providing a controller operable control the finite variable transmission ratio;
c) determining the frequency of the electricity generated by the AC electrical generator;
d) providing control logic that correlates the finite variable transmission ratio to the determined frequency and the target frequency;
e) in the controller, determining the finite variable transmission ratio so that the AC electrical generator produces AC electricity at the target frequency;
f) adjusting the transmission ratio of the variable diameter pulley drive so the AC electrical generator produces AC electricity at the target frequency;
g) providing a pneumatic actuator that adjusts the position of a V-pulley member of the variable diameter pulley drive, wherein the pneumatic actuator does not include internal spring actuation.

15. A kit comprising:
an AC electrical generator operable to produce AC electrical energy at a target frequency when rotated a target speed;
a frequency sensor operable to determine the frequency of the AC electricity generated by said AC electrical generator;
a continuously variable transmission operable to couple an independently controlled, rotating variable speed mechanical output to said AC electrical generator; said continuously variable transmission having a finite variable transmission ratio; and
a controller operable to control said finite variable transmission ratio based at least in part on the determined frequency of the AC electricity generated by said AC electrical generator such that the variable speed rotating mechanical output rotates said AC electrical generator substantially at the target speed when coupled together.

16. The kit of claim 15, wherein said continuously variable transmission is selected from the group consisting of: a variable diameter pulley drive, an infinitely variable transmission, a ratcheting continuously variable transmission, a roller-based continuously variable transmission, a hydrostatic continuously variable transmission, a hydristor infinitely variable transmission and a ratcheting CVT.

17. The kit of claim 15, wherein said continuously variable transmission is a variable diameter pulley drive.

18. A kit comprising:
an AC electrical generator operable to produce AC electrical energy at a target frequency when rotated a target speed;
a continuously variable transmission operable to couple an independently controlled, rotating variable speed mechanical output to said AC electrical generator; said continuously variable transmission having a finite variable transmission ratio;
a controller operable to control said finite variable transmission ratio such that the variable speed rotating mechanical output rotates said AC electrical generator substantially at the target speed when coupled together; and an RPM sensor operable to determine a rotational speed before said continuously variable transmission, wherein said controller is operable to control said finite variable transmission ratio based at least in part on the determined rotational speed before said continuously variable transmission.

19. A kit comprising:

an AC electrical generator operable to produce AC electrical energy at a target frequency when rotated a target speed;

a variable diameter pulley drive operable to couple an independently controlled, rotating variable speed mechanical output to said AC electrical generator; said variable diameter pulley drive having a finite variable transmission ratio; and a controller operable to control said finite variable transmission ratio such that the variable speed rotating mechanical output rotates said AC electrical generator substantially at the target speed when coupled together; and a pneumatic actuator operable to adjust the position of a V-pulley member of said variable diameter pulley drive, wherein said pneumatic actuator does not include internal spring actuation.

20. The AC electrical generator system of claim 19, further comprising an RPM sensor operable to determine a rotational speed before said variable diameter pulley drive, wherein said controller is operable to control said finite variable transmission ratio based at least in part on the determined rotational speed before said variable diameter pulley drive.

* * * * *

UNITED STATES PATENT AND TRADEMARK OFFICE
CERTIFICATE OF CORRECTION

| | | |
|---|---|---|
| PATENT NO. | : 7,915,748 B2 | Page 1 of 1 |
| APPLICATION NO. | : 12/684550 | |
| DATED | : March 29, 2011 | |
| INVENTOR(S) | : David L. Storm | |

It is certified that error appears in the above-identified patent and that said Letters Patent is hereby corrected as shown below:

Title Page; line 1;
In the Abstract, item 57, please remove the word "herein."

In column 8, line 37, please change "seed" to --speed--

In column 12, line 51, please change "understand" to --understood--

Signed and Sealed this
Twenty-fourth Day of May, 2011

David J. Kappos
*Director of the United States Patent and Trademark Office*